United States Patent [19]

Strenglein

[11] 3,750,169

[45] July 31, 1973

[54] VEHICULAR SAFETY SYSTEM

[75] Inventor: Harry F. Strenglein, Clearwater, Fla.

[73] Assignee: Sperry Rand Corporation, New York, N.Y.

[22] Filed: Mar. 13, 1972

[21] Appl. No.: 234,059

[52] U.S. Cl. ......................... 343/7 ED, 343/112 CA
[51] Int. Cl. ............................................. G01s 9/04
[58] Field of Search ................... 343/7 ED, 112 CA

[56] References Cited
UNITED STATES PATENTS

| | | | |
|---|---|---|---|
| 3,005,194 | 10/1961 | Goodell et al. | 343/7 ED |
| 3,153,230 | 10/1964 | Van Krevelen et al. | 343/7 ED X |
| 3,703,702 | 11/1972 | Arai | 343/7 ED |

Primary Examiner—Malcolm F. Hubler
Attorney—Howard P. Terry

[57] ABSTRACT

A vehicular safety apparatus includes radio sensor means for the detection of an impending collision immediately prior to contact of the protected vehicle with another object and for actuation of restraining or other safety devices for protecting occupants of the vehicle when the crash event actually occurs. Base-band radio pulse transmission and reception presence sensor devices with first and second zone echo signal gating channels provide distinctive output signals at first and second distances between the protected vehicle and the reflecting object, which signals when present simultaneously cause actuation of the protective devices.

14 Claims, 7 Drawing Figures

VEHICULAR SAFETY SYSTEM

BACKGROUND OF THE INVENTION

1. Field of the Invention

The invention pertains to safety apparatus for the detection of an impending vehicular collision and for the automatic operation of protective devices and more particularly concerns means for utilizing successively reflected base-band or very short duration radio signals for the generation of distinct control signals according to the presence and relative speed of the reflecting object.

2. Description of the Prior Art

In the prior art, both pulse and continuous wave radio object detection systems have been considered as sensors for warning of the potentiality of vehicle collisions or for operating certain devices tending to diminish the potential of vehicular collisions, such as between a following car and a vehicle in front of it. As to such prior art systems proposing the use of pulsed transmissions, relatively high power is radiated and the use of a wide portion of the electromagnetic spectrum is demanded, thus rendering a considerable part of the high frequency spectrum useless for communication or for other desirable purposes. Such prior art systems also block cooperative or other receivers for a considerable time, rendering them useless for sensing obstacles at near ranges. Continuous wave systems have been suggested for the collision avoidance or detection function; but they, too, generally have many of the disadvantages of pulse systems for short range meansurement, as well as having cyclic range ambiguity characteristics.

In consequence of these and other serious deficiencies of the prior art, those seeking to devise means for protecting vehicles passengers in actual collisions between vehicles or between a vehicle and another object have sought to use crude mechanical sensors in the form of decelerometer-like devices which in theory operate only after the collision impact occurs; i.e., they are not capable of anticipating the crash event. For example, one such mechanical sensor device includes a mass which is biased to an inactive position against a stop by plural spring contact members. During an actual collision, the mass is designed to move, overcoming the spring bias and activating a safety device such as a passenger restraining gas bag. Because such sensors lack the capability of anticipating a crash event, they are actuated, where they do perform reliably, always after the passenger's body has started to move toward the vehicle instrument board; i.e., the passenger is struck by the gas bag moving toward him relatively faster than the instrument board of the vehicle.

In this and in similar mechanical sensors which have been proposed for safety device actuation, the apparatus is presumed to be always in condition to operate satisfactorily, while in fact it may have remained in a dormant, untended, and untested condition for months or even years. Fail-safe and operability monitoring instrumentalities are not present and, more important, even if present are generally incapable of reliable application to such decelerometer devices, since such decelerometer devices are designed as strictly one-shot mechanical elements and do not readily accommodate themselves by nature to testing. While these prior art deceleration sensing devices are theoretically devised to be actuated at a particular impact level, there is little hope that they can demonstrate accurately repeatable characteristics in actual practice.

SUMMARY OF THE INVENTION

The present invention relates to vehicular safety systems that include radio sensor means for the detection of a potential collision of a protected vehicle with another vehicle or other object immediately prior to impact and for actuation of restraining or other safety devices also just prior to the collision for the protection of occupants of the vehicle before the crash event actually occurs. Like the radio sensor system of the G.F.Ross U.S. Pat. application Ser. No. 145,154, entitled "Vehicle Safety Apparatus", filed May 20, 1971, and assigned to the Sperry Rand Corporation, the radio sensor of the present invention employs base-band or very short duration electromagnetic pulse transmission and reception devices providing range zone gating arrangements adapted to sense relative speeds of the vehicles involved in the potential crash. Outputs of the range zone gates are employed when simultaneously present to activate passenger restraining or other protective devices in anticipation of the actual collision event. The radio object or collision sensor system is so constructed and arranged as to afford sensing of near range vehicles or other objects without interference with the operation of conventional radio communication systems and, in turn, without being substantially affected in normal operation by the radiations of other radio frequency systems or by ambient electrical noise signals.

The collision sensor transmitter appropriate for employment in the novel collision sensor system may utilize a non-dispersive transmission line system for generation of base-band or sub-nanosecond pulses of electromagnetic energy and for their radiation into space. Such base-band pulses have an extremely wide energy spectrum; while the total energy content of any given transmitted base-band pulse may be considerable, the few spectral lines falling within the relatively narrow pass band of a conventional receiver are of low amplitude and have no interfering effect thereon.

The radio object of collision sensor receiver suitable for detecting and utilizing such short base-band electromagnetic pulses may also employ a dispersionless transmission line antenna, with a utilization circuit cooperating with a gated semiconductor detector element located within the antenna transmission line for instantaneously detecting substantially the total energy of the base-band pulse and for supplying a corresponding output suitable for processing in short range detection circuits. The receiver antenna system supplies substantially the total energy of each undistorted base-band pulse directly to the gated receiver detector; thus, the receiver is adapted to operate successfully with pulse signals having a very wide spectral extent. Further, the receiver may operate with base-band pulse signals having spectral components each of such low individual energy content as to escape detection by conventional relatively narrow band receivers. The total energy in each base-band pulse may, however, be relatively larger than the level of noise or other interfering pulses or signals in the vicinity of the novel receiver. Thus, by appropriately adjusting the output level of the collision sensor transmitter and the sensitivity or threshold of the collision sensor receiver, base-band signals not affecting other receivers are readily transmitted, received, and detected without the collision sensor receiver, in turn, being affected in any substantial degree by other radio energy transmissions. The major processing of the echo signals is accomplished, according to the invention, by simple base-band signal processing circuits, thus avoiding the need for signal frequency conversion and the problems associated with alignment and operation of conventional radio and intermediate frequency amplifiers.

The novel base-band collision sensor system operates with very low energy consumption, so that power supply cost and size are minimized. Furthermore, with such low power operation, inexpensive components find long life use throughout the transmitter. The receiver and signal processor circuits are similarly categorized, all elements being of very simple nature and otherwise inexpensive of installation, maintenance, and operation, adapting readily to cooperative use with conventional processing and control equipment.

DESCRIPTION OF THE PREFERRED EMBODIMENTS

Figure 1:
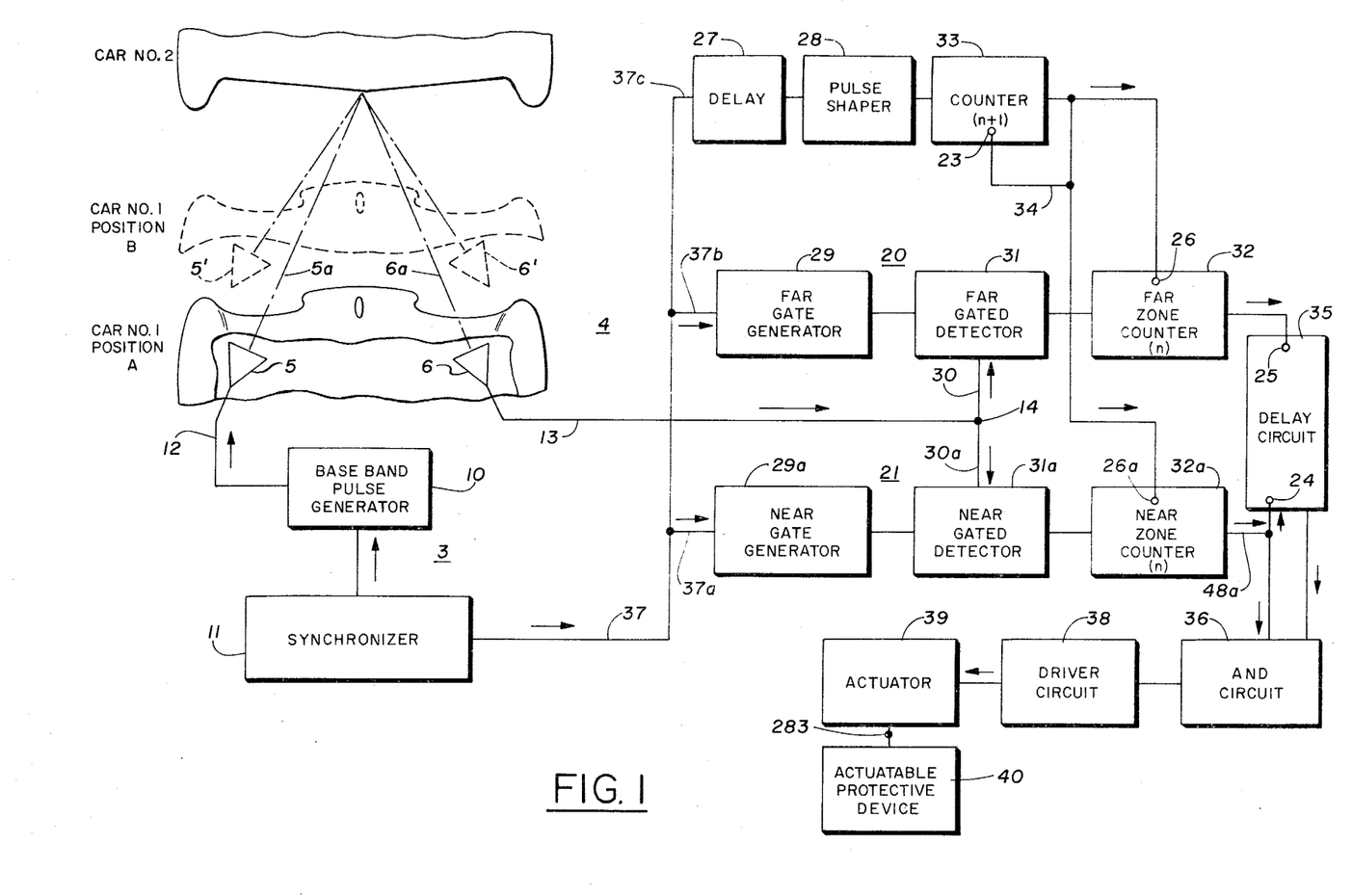
FIG. 1 is a diagram of a preferred embodiment of the invention showing components thereof and their electrical interconnections.

FIG. 1 illustrates the front of a protected vehicle in successive positions A and B with respect to the rear of a second vehicle 2. It will be understood that both cars 1 and 2 may be moving, and otherwise that relative motion between the two may cause car 1 to move from position A to a position such as position B, thus decreasing the distance between the two vehicles. Should a relative speed difference be maintained, a contact between the two vehicles is inevitable. If the maintained relative speed is above a nominal value, collision damage to the cars and injury to their occupants is a probable consequence. It will be recognized that object 2 may be a stationary vehicle or may be a normally stationary object such as a metal highway barrier or wall.

According to the invention, impending collisions of the above kind with vehicles or other objects are detected for the purpose of operating safety devices of known types for the reduction of damage to one or both vehicles and of injuries to vehicle occupants. For this purpose, there is provided within car 1 a base-band pulse transmitter 3 and a cooperating echo reception and detector system 4 of a novel type adapted to operate using sub-nanosecond duration pulses of electromagnetic energy. A transmitter antenna 5 may be located at the left side of car 1 behind a dielectric grille at the front of the car, with a radiation pattern directed in a generally forward manner toward any obstacle to forward motion of car 1 that might be present, such as car 2. A receiver antenna 6 may be similarly mounted at the right side of car 1 behind the dielectric grille being directed so that its receptivity pattern is arranged to collect signals reflected from an obstacle such as car 2. It will be apparent to those skilled in the art that the dash-dot lines 5a and 6a are intended in a general way to represent paths taken by radiation transmitted by antenna 5, reflected at a representative reflecting point on car 2, and received by receiver antenna 6. Antennas 5 and 6 preferably have respective radiation and receptivity patterns sufficiently wide for echo energy to be collected generally from the rear or other part of car 2.

The transmitter system 4 utilizes a base-band transmitter or pulse generator 10 and the directive radiator antenna 5, the transmitter pulse generator 10 being connected to radiator or antenna 5 through an interconnecting transmission line system 12. Generator 10 may be of the synchronized or self-synchronizing kind and may be of a generally conventional type. For example, there is known in the art a variety of transmitter systems for producing single positive or negative going pulses or regular or other trains of pulses, each such pulse having a very short duration, and for radiating such pulses from a suitable antenna 5. Spark gap transmitters, for instance, readily produce short duration electromagnetic pulses. Delay line pulse generators are well understood in the art to be capable of adjustment such that very short electromagnetic pulses may be radiated. One device for producing such short duration or base-band pulses is disclosed by G.F.Ross in the U.S. Pat. 3,402,370 for a "Pulse Generator", issued Nov. 30, 1965, and assigned to the Sperry Rand Corporation.

While prior art transmitters are not normally used to produce truly short duration base-band or sub-nanosecond pulses, mere adjustment of parametric relations may permit such a result substantially to be obtained. Further, the performance of such transmitters in efficiently launching actual base-band pulses into space may be greatly improved by the use of the general kind of radiating antenna system employed by G.F.Ross and D. Lamensdorf in the U.S. Pat. application Ser. No. 46,079 for a "Balanced Radiation System," filed June 15, 1970 and assigned to the Sperry Rand Corporation. The latter device, for instance, employs an electrically smooth, constant impedance, transmission line system for propagating TEM mode electromagnetic waves. The transmission line system is employed for the cooperative cyclic storage of energy on the transmission line and for its cyclic release by propagation along the transmission line and radiation at the end of a section of the transmission line formed into a directive antenna. Discharge of the line may be accomplished, for instance, by a conventional mechanically resonant mercury switch having an operating frequency for switching at a 200 cycle per second rate, for example. Thus, cooperative use is made of the transmission line system for signal generation by charging the transmission line at a first rate and also for signal radiation into space by discharging the line in a time much shorter than required for charging. Discharge of the transmission line causes a voltage wave to travel to the radiating aperture of the antenna structure. The process operates to produce, by differentiation at the aperture, a sharp base-band impulse of sub-nanosecond duration that is radiated into space. The antenna system 5 has a wide instantaneous band width, so that it may radiate such very sharp impulse-like signals with low distortion. Further, antenna 5 has an energy focusing characteristic such that energy radiated into space in a predetermined direction is maximized, as is desirable in object detection systems.

The radiated base-band signal propagates in free space toward a reflecting target such as the rear of car 2 and is reflected by the target surface to return toward receiver antenna 6. The wave returned may have been modified by the usual manner according to the particular nature of the reflecting object or target 2 so that it may have a somewhat time extended appearance. The echo wave is delayed with respect to the transmitted wave by a time which is proportional to twice the distance or range to the reflecting target 2. The receiver antenna 6 may have properties generally similar to those of the transmitter antenna 5 in that it employs a similar electrically smooth, constant impedance transmission line system for propagating TEM mode electromagnetic waves, as will be explained in connection with FIG. 5, so that collected echo signals of very short duration propagate into the receiver antenna with substantially no distortion. It will be understood that the transmission lines 12 and 13 connected to the antenna elements 5 and 6 are selected for their ability to propagate base-band signals with substantially no distortion. While dual parallel conductor lines or coaxial transmission lines are preferably employed, any selected energy transmission medium should be devoid of impedance discontinuities and should be so constructed and arranged as to support TEM mode propagation of the high frequency energy, since it is the TEM transmission line mode that is the substantially non-dispersive mode.

Any echo signal appearing on receiver antenna transmission line 13 is connected by matched tee junction 14 substantially equally into a first or far zone gated detector channel 20 and into a second or near zone gated detector channel 21. Considering far zone gated detector channel 20, the transmission line 30 stemming from matched tee 14 supplies any such echo signal to far zone gated detector 31. Since transmission line 30 is also of the type adapted to propagate signals in the TEM mode, such signals arrive at far zone gated detector 31 with no substantial degree of distortion. Signals passed by far zone gated detector 31 are those falling within a first particular time era or far zone, as will be described, and produce within circuit 31 somewhat amplified, time-duration-extended output pulses for coupling to far zone counter 32. The output of far zone counter 32 is supplied to conventional pulse delay circuit 35 as a first input at start terminal 25. Delay circuit 35 supplies a delayed input to a first terminal of AND circuit 36. The time duration of sensitivity of far zone gated detector 31 is determined by far zone gate generator 29, whose operation is synchronized by time reference pulses supplied by transmitter synchronizer 11 via leads 37 and 37b to far zone gate generator 29.

The same echo signals appearing on line 13 are supplied by matched tee junction 14 and transmission line 30a to the second or near zone gated detector channel 21, transmission line 30a also being adapted to propagate TEM mode signals with not substantial distortion into near zone gated detector 31a. Signals passing through near zone gated detector 31a are those falling within a second particular time era, as will be explained, and similarly produce within circuit 31a somewhat amplified, time-duration-extended output pulses for coupling to near zone counter 32a which, in turn, feeds a second input of AND circuit 36. The gate time duration is determined by near zone gate generator 29a, whose operation is also synchronized by time reference pulses supplied by transmitter synchronizer 11 via leads 37 and 37a to near zone gate generator 29a.

The time reference pulse output of synchronizer 11 is supplied by lines 37 and 37c to a counter circuit 33 which supplies three outputs. A first output is fed back into reset terminal 23 at an early stage of counter 33 via lead 34 for purposes yet to be explained. The output of counter 33 is also coupled as second input to reset terminals 26, 26a of the respective far zone counter 32 and the near zone counter 32a. The input to counter 33 is preferably supplied through a conventional delay circuit 27 and a conventional pulse shaping circuit 28, which may be a monostable multivibrator. Counters 32, 32a, and 33 are also conventional counter circuits, with the particular proviso that the count of counter 33 is one or more greater than the counts of counters 32, 32a. Also, counter 33 resets itself because of connection 34. Counters 32, 32a each accept a reset signal generated by counter 33.

According to the invention, the substantially simultaneous arrival of signals on the two inputs of AND gate 36 is a consequence of the fact that an actual collision of the vehicle 1 and another object 2 iS certain to occur. When such signals substantially coincide, an output generated by AND gate 36 is applied to operate protective devices 38, 39, 40. The output of AND gate 36 may be amplified, if desired, by driver circuit 38 for operating a conventional actuator 39 and thus the protective device 40, as will be described.

In operation, the apparatus may be organized so that the near zone lies, for example, from 2.5 feet to 4 feet in front of the vehicle 1 to be protected, while the far zone slightly overlaps the near zone, extending from 3.5 feet to 5 feet in front of the vehicle 1. A typical system may employ sub-nanosecond duration transmitted pulses at a repetition rate of 10kHz. The count index $n$ associated with counters 32, 32a, 33 may lie between 8 and 10, for example.

Operation of the invention will be apparent from the foregoing description. Transmitter generator 10 is caused by synchronizer 11 to direct sub-nanosecond or base-band pulses from transmitter antenna 5 forwardly. Each such pulse is reflected by any objects found in the near and far zones. Under normal driving conditions, the apparatus will detect no echo pulses in either zone, since no object is normally present in either zone.

If echoes appear due to the presence of an object in the far zone, these echoes are detected by far zone gated detector 31 and are counted in far zone counter 32. Similarly, if echoes appear because of the presence of an object in the near zone, these echoes are detected by near zone gated detector 31a and are counted in near zone counter 32a. Since counters 32 and 32a are reset once for every $(n+1)$ synchronizer or transmitter pulses by $(n+1)$ counter 33, it is seen that receipt of $n$ consecutive echoes in either range zone indicates the presence of an object in the respective zone. Delay 27 and pulse shaper 28 may be placed ahead of $(n+1)$ counter 33, if required, to shape and time the output of synchronizer 11 for best operation of $(n+1)$ counter 33. The $(n+1)$ counter configuration ensures that for a normal sequence of $n$ echo returns, the outputs of counters 32 and 32a persist at least for one system pulse repetition period. Counter 33 may conceivably use $(n+m)$ counts, where $m$ includes other integers as well as unity. Here, the numbers $n$ and $m$ are chosen by normal statistical considerations to ensure to the desired degree against false triggering by other or non-cooperating sources of pulsed energy. When outer or far zone counter 32 is filled, it supplies an output to the start or trigger terminal 25 of delay circuit 35, which circuit 35 consequently supplies a delayed signal to AND circuit 36 in the conventional manner. Should an output be generated by near zone counter 32a during the timed output of delay circuit 35, an enabling output is generated by AND gate 36 for operating protective mechanism 40. The system is adjusted so that the AND gate 36 output may appear only for a certain range of relative speeds between cars 1 and 2, such as between 10 and 200 miles per hour.

Delay circuit 35 is so proportioned that:
a. simultaneous or nearly simultaneous filling of the respective near and far zone counters 32, 32a desirably does not produce coincidence between the outputs of delay circuit 35 and near zone counter 32a,
b. filling near zone counter 32a after the time delay which corresponds to a difference in car velocities below a predetermined value desirably does not produce coincidence between the outputs of delay circuit 35 and near zone counter 32a, and
c. both counters 32, 32a desirably fail to fill for at least one complete counting cycle $(n)$ before first reset. Such adjustment ensures no response from the AND circuit 36 when the protective system is first turned on, as when the car is first started when parked in a garage or behind another vehicle. Also, if interfering signals are present, both counters might fill simultaneously; an undesired output from AND circuit 36 is prevented in this circumstance. Thus, the apparaus is rendered free of false responses; it does not deploy the protective mechanism 39, 40 also when the time interval between filling the far zone counter 32 and the near zone counter 32a is too great, the corresponding low differential velocity between cars 1 and 2 being less than justifies operating protective device 40. It should be noted that prior art devices have required a velocity output from the protected vehicle drive system to provide disablement of the system when the car is stopped or moving only very slowly. Such prior art arrangements may defeat operation of the protective system at high speed when brakes are locked in a panic stop effort. The present system avoids such a failure possibility.

Accordingly, it is seen that input signals supplied in certain time relation to AND gate 36 cause operation of protective mechanism 39, 40. This simultaneous presence of inputs to AND circuit 36 may cause a driver circuit 38 to operate and to control a conventional protective or other damage or injury reducing device yet to be described. As will be seen, actuator 39 may be of the type adapted for providing a remedial function, for example, either by mechanical or electrical entities. It will also be understood by those skilled in the art that the novel radio detector system may be located at the rear of a protected vehicle as well as on its front, or in other locations.

It is seen that if the speed of the protected vehicle lies in the protected range (10 to 200 miles per hour), actuator 39 is operated, and may cause a protective device 40 such as an inflatable gas bag for protection or restraint of passengers within car 1 to be expanded. If car 1 is moving forward at an absolute rate below the aforementioned low predetermined value (10 miles per hour), there is no output from AND circuit 36, and actuator 39 cannot operate; such action permits car 1 to be parked behind another vehicle, for instance, without exciting actuator 39. Further, if the relative speed between cars 1 and 2 is too high, the actuator 39 does not operate. Above the relative high speed of 200 miles per hour, for example, it may be considered that any accident is totally destructive and operation of a protective or restraint device, such as a conventional gas bag, would have little effect. More important, the high speed cut-off value is selected at a value unlikely to represent the relative speed of a true obstacle, but is symptomatic of a condition actually caused by the filling of the counters under the influence of a relatively high level continuous wave microwave signal or other similar noise signal. The lower limit of 10 miles per hour and the upper limit of 200 miles per hour are readily subject to adjustment to conform to Government standards by simple circuit adjustment. It will further be understood that all parametric values mentioned above and in general in connection with wave form timing and duration may be adjusted over considerable ranges according to prevailing traffic patterns or regulations, and that the specific numbers mentioned are selected purely for illustrative purposes and are not intended to be interpreted in a limiting sense. It is seen that operation of actuator 39 and device 40 is determined according to inherent time reaction characteristics so that they are to be operated sufficiently prior to the actual collision to perform their functions adequately.

Far zone and near zone gated detector circuits 31 and 31a are adapted to gate sub-nanosecond or very short duration electromagnetic pulses received respectively on TEM mode transmission lines 30 and 30a under control of the respective far zone and near zone gate generators 29 and 29a. Operation of these elements in the gating channels 20 and 21 is similar, and attention will, as a matter of convenience, therefore be turned first to describing the near zone gate generator 29a and the near zone gated detector 31a of channel 21. It will be recognized that this gating system is of the type disclosed and claimed by G.F. Ross in the U.S. Pat. application Ser. No. 137,355 for an "Energy Amplifying Selector Gate for Base-Band Signals," filed Apr. 26, 1971 and assigned to the Sperry Rand Corporation.

Figure 2:
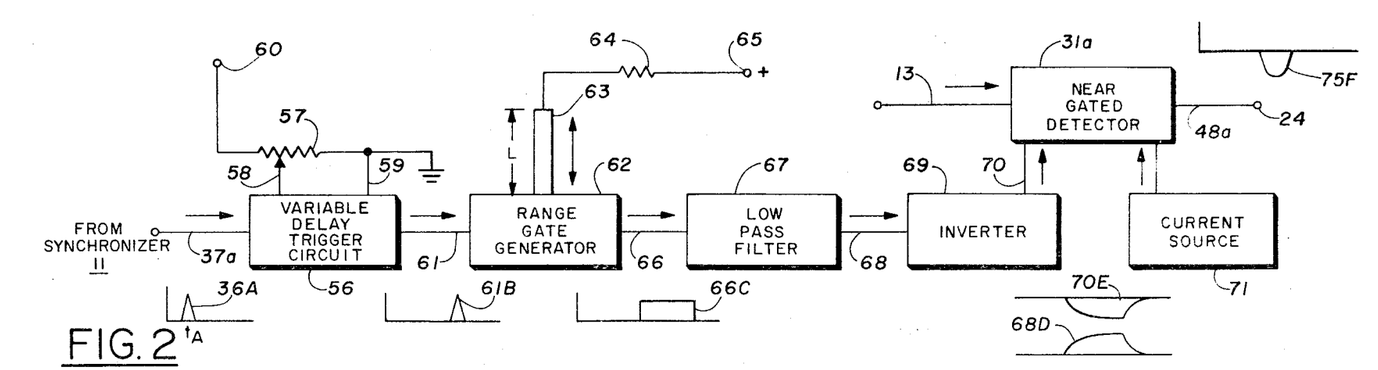
FIG. 2 is a block diagram of the range gating apparatus of FIG. 1.
Figure 3:
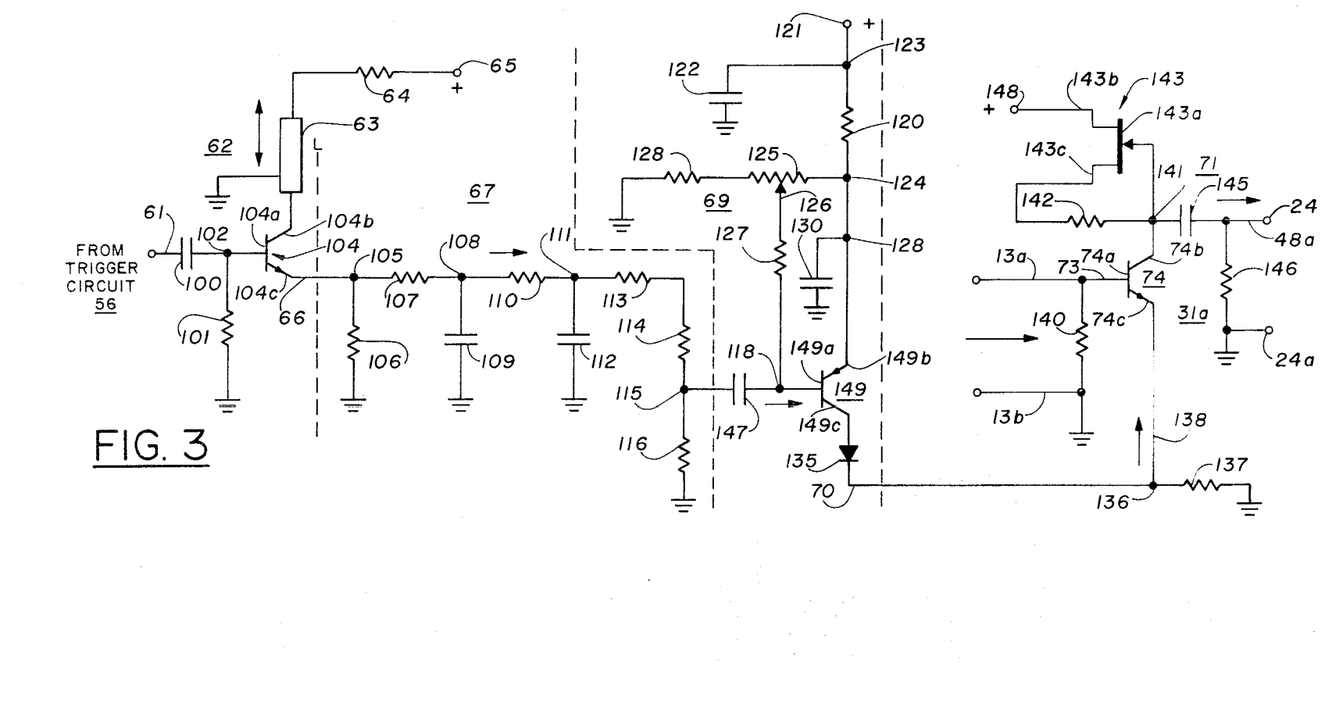
FIG. 3 is a circuit diagram showing details of a portion of the apparatus of FIG. 2.

For controlling the operation of the near zone gated detector 29a of FIGS. 1, 2, and 3, the synchronizer pulse 36A occurring at time $t_A$ in FIG. 2 is coupled by line 37a to a variable delay trigger circuit 56 for the purpose of generating on output line 61 a corresponding pulse 61B. Pulse 61B may be generally similar to pulse 36A, though delayed by a predetermined time interval. Variable delay trigger circuit 56 may be any of several well known adjustable pulse delay circuits, including those, for instance, whose delay characteristic may be varied or set according to the adjustment of a tap 58 movable along potentiometer 57 relative to lead 59, an appropriate potential being supplied to the opposite end of potentiometer 57 from a voltage source (not shown) connected to terminal 60 and which voltage source may also be grounded at its opposite end.

Variable delay trigger circuit 56 serves to determine the initiation of the near zone gate, while near zone range gate generator 62, whose input is supplied via line 61, determines the duration of the near zone gate. This duration is determined, as will be further explained in connection with FIG. 3, according to the length L of transmission line 63, whose center conductor is adapted to supply an operating voltage via resistor 64 from terminal 65 to internal active circuit elements of near zone gate generator 62. The near range or zone gate thus formed is the wave 66C.

Wave 66C is supplied by line 66 to low pass filter 67, whose function is to provide a moderate integration to wave 66C, removing any transients or over-shoots from the edges of wave 66C and thus preventing false operation of succeeding circuits. Wave 68D is the modified output of filter 67, which output may be provided as a positive going wave passing through inverter 69 to produce on line 70 the inverted or negative going wave 70E. Wave 70E is generally similar to wave 68D, but is inverted in polarity.

The inverted wave 70E is used to operate near zone gated receiver-detector circuit 31a and current source circuit 71 which form, as will be explained, the actual near zone gating potential used to control flow of signals through the near zone gated receiver-detector 31a from transmission line 13 to output lead 48a (wave 75F). Near zone gated detector 31a is normally desensitized; when a near zone gating signal is present at the output 70 of inverter 69, the near zone gated detector 31a is made sensitive to the presence of, for instance, 100 millivolt signals appearing on dispersionless transmission line 13 and propagated into gated detector 31a. Such sensitivity produces an amplified selected or near zone gated output wave 75F on lead 48a of the order of 3 volts. Such a signal on lead 48a is adapted to operate actuator 39 in the presence of other signals of appropriate amplitude.

In FIG. 3, circuit details of the near zone gating system are further illustrated, with elements which appear also in FIG. 2 bearing the same reference numerals as used in FIG. 2, including near zone range gate generator 62, low pass filter 67, inverter 69, current source circuit 71, near zone gated detector 31a, and transmission line 13. The output line 61 of variable delay trigger circuit 56 supplies wave 61B via coupling capacitor 100 and junction 102 to the base 104a of transistor 104, which transistor 104 may be of the 2N5130 type. Junction 102, and therefore base 104a, is coupled to ground through resistor 101. The collector 104b of transistor 104 is coupled via the inner conductor of coaxial transmission line 63 of length L through resistor 64 to a source (not shown) of positive potential connected between terminal 65 and ground. The length L of open-circuited delay line 63 is adjusted according to the desired duration of the sampling or near zone gate wave 70E. The emitter 104c of transistor 104 provides an output connection via lead 66 to low pass filter 67. In a respresentative circuit, resistor 64 has the value of 47 K ohms, while the voltage on terminal 65 may be form +200 to +300 volts.

The emitter 104c of transistor 104 is coupled to junction 105 to provide an input to low pass filter 67, which filter 67 is of generally conventional nature and whose components include in series relation junction 105, resistor 107, junction 108, resistor 110, junction 111, resistor 113, resistor 114, junction 115, resistor 116, and a ground connection. Junction 105 is coupled to ground via resistor 106 and the respective junctions 108 and 111 are coupled to ground through low pass filter capacitors 109 and 112. Junction 115 serves as an output terminal for filter 67.

Junction 115 is coupled through a small coupling capacitor 147 to junction 118 of the inverter circuit 69 and thence to the base 149a of transistor 149, which may be of the 2N4258 kind. The emitter 149b of transistor 149 is coupled through a series circuit including junctions 128 and 124, resistor 120, and junction 123, to a source (not shown) of positive potential applied at terminal 121 and connected to ground at its opposite end. Junctions 123 and 128 are respectively coupled to ground via capacitors 122 and 130, while junction 124 is connected through potentiometer 125 and resistor 128 to ground. Capacitors 122 and 130 serve as radio frequency by-pass and decoupling components in the conventional manner. The tap 126 of potentiometer 125 is connected through resistor 127 to junction 118. The collector 149c of transistor 149 is connected as an output of the inverter 69 through diode 135. The resistance network associated with potentiometer 125 serves to adjust the potential across resistor 137 which determines the steady state hold off bias on the detector.

Diode 135 is connected by line 70 to junction 136 through resistor 137 to ground and via line 138 to the emitter 74c of near zone gated detector transistor 74, which may be of the 2N5130 type. Transistor 74 serves as the primary active element of near zone gated detector 31a of FIG. 2. The collector 74b of transistor 74 is connected through junction 141 to the gate electrode 143a of field effect transistor 143, which latter may be of the 2N4274 type. The drain electrode 143b of transistor 143 is connected to a source (not shown) of positive potential applied at terminal 148 which may be of the order of +75 to +100 volts with respect to ground. The source electrode 143c of transistor 143 is coupled via resistor 142 to junction 141 and also via coupling condenser 145 to the final output 48a consisting of output leads 24 and 24a connected across load resistor 146.

Base-band or sub-nanosecond echo signals to be near zone gated are applied by line 13a to the base 74a of detector transistor 74. Such base band signals may be found across the matching load resistor 140 attached across a conventional non-dispersive TEM mode transmission line such as a continuous two-wire line comprising constant impedance or uniformly spaced parallel conductors 13a, 13b.

Operation of the wave amplifying selector of near zone gate circuit 31a will be understood from the foregoing. It is seen that range gate generator 62 relies for its operation upon characteristics inherent in the 2N5130 avalanche transistor 104 and in the open circuited delay line 63 of length L. In response to the positive triggering signal 61B, transistor 104 breaks into conduction and a voltage step wave is propagated into delay line 63. When this step wave reaches the open end of line 63, it is reflected there and returns to collecJor 104b, whereupon the current flow in transistor 104 is brought abruptly to zero and transistor 104 reverts to its non-conducting condition. Thus, the voltage wave 66C across filter resistor 106 is a sharply rising and terminating positive pulse of duration $2L/c$ seconds, a duration dictated by the length L of delay line 63 (c is the velocity of propagation of the step wave in delay line 63).

In the quiescent state of the circuit of FIG. 3, transistor 149 in inverter circuit 69 is normally fully conducting, causing a current of about 30 milliamperes to flow through the emitter resistor 137 associated with near zone gated detector transistor 74 (resistor 137 may have a resistance value of about 100 ohms). The voltage consequently appearing across resistor 137 will be about +3 volts and assures that detector transistor 74 is in its non-conducting state. The field effect transistor 143 acts as a constant current source, assuring that a constant current is fed via the collector 74b and emitter 74c of detector transistor 74 in its quiescent or non-conducting state so that its bias state is precisely controlled. Resistor 142 in the collector circuit of detector transistor 74 has a positive thermal coefficient and serves to afford temperature compensation for the thermal characteristic of the conduction threshold of detector transistor 74.

When wave 61B triggers range gate generator 62, the positive output wave 66C produced by near zone range gate generator 62 is, as previously explained, fed through low pass filter 67 to inverter 69. In traversing filter 67, wave 66C is acted upon so that the positive wave 68D results, having rounded rise and fall portions. Accordingly, any high level transients near the start or the end of wave 66C are removed, a desirable result since they might otherwise undesirably trigger near zone detector transistor 74 into conduction.

The positive wave 68D, when coupled by capacitor 147 to inverter circuit 69 and thus to the base 149a of transistor 149, causes current conduction through transistor 149 to stop, forcing the voltage across resistor 137 rapidly to fall to zero. This event places near zone detector transistor 74 in its fully sensitive state with respect to any signal to be sampled that is propagated to it along dispersionless transmission line 13a, for example, and thereby arriving at the base 74a of transistor 74. Any signal sampled or near zone gated by detector transistor 74 appears as a negative amplified and time extended wave 75F on the collector 74b of detector transistor 74 and is supplied by coupling condenser 145 across load resistor 146, for example. It may then be supplied to terminal 24 of AND gate 36 or other utilization apparatus in the customary manner, since wave 75F is amplified and time extended with respect to the received and near zone gated short pulse or echo signal. Upon termination of the near zone gating pulse 68D, the circuit returns to its above described quiescent state, awaiting receipt of the next succeeding triggering wave 61B.

It will be noted that transmission of short-duration pulses from their source, such as from base-band pulse generator 10 of FIG. 1, is through a transmission medium that preferably operates substantially solely in the TEM mode, and that propagation modes that permit dispersion of pulses such as subnanosecond or base-band pulses are not used. Thus, the full energy of any received echo or other base-band pulses originally generated by transmitter generator 10 is effectively directed to processing within the amplifying near zone gated detector 31a. It is seen that the invention utilizes sampling or gating means having gain for the precise short-duration sampling electromagnetic waves wherein the sampling time and sampling duration depend upon reliably stable elements, and that the sampling system employs stable, balanced, non-dispersive transmission line elements for preventing distortion of the signals to be sampled. It will readily be understood that the near zone gate generator 29a and the near zone gated detector 31a of near zone gating channel 21 have similar counterpart components in far zone gating channel 20 in the form of far zone gate generator 29 and far zone gated detector 31.

Figure 4:
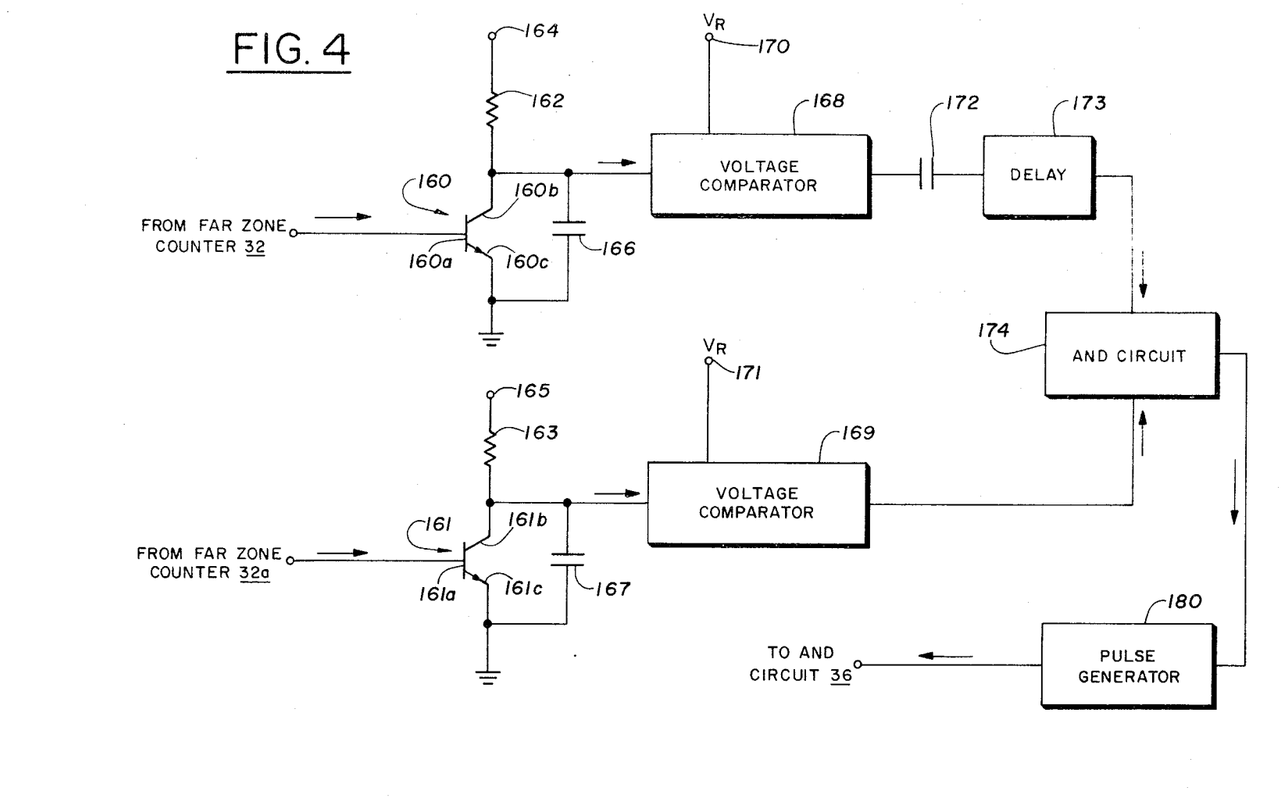
FIG. 4 is a circuit diagram showing details of a portion of the apparatus of FIG. 1.

FIG. 4 illustrates an alternative form of the delay circuit 35 of FIG. 1 in which the respective outputs of far and near zone counters 32 and 32a are applied to the bases 160a, 161a of respective transistors 160, 161. In the far zone counter channel, for example, the collector 160b is coupled through resistor 162 at terminal 164 to a suitable potential source (not shown). A capacitor 166 is coupled between collector 160b and emitter 160c and the latter is grounded. In a similar manner, in the near zone channel, counter 32a is connected to the base 161a of transistor 161 whose collector 161b is coupled through resistor 163 at terminal 165 to a similar stable potential source. A capacitor 167 is coupled between collector 161b and emitter 161c and the latter is grounded.

The output of transistor 160 is coupled to voltage comparator 168, to a second input 170 of which is applied a stable reference voltage from a suitable source (not shown). The output of comparator 168 is capacity coupled (172) to the delay circuit 173. Any delayed output of circuit 173 is passed to a first input of AND circuit 36 of FIG. 1. In a generally similar manner, the output of near zone transistor 161 is coupled to voltage comparator 169, to a second input 171 of which is supplied a stable reference voltage similar to that found at terminal 170. Any output of voltage comparator 169 may be coupled directly to a second input of AND circuit 36.

When far zone counter 32 of FIG. 1 supplies a positive pulse in FIG. 4 to the base 160a of transistor 160, transistor 160 conducts, discharging capacitor 166. This event causes an abrupt change in the output of the conventional voltage comparator 168, which output change is supplied by capacitor 172 to delay circuit 173, which event produces a short pulse of a few milliseconds length one millisecond after its input. As long as far zone echo pulses are received at the system rate, capacitor 166 cannot recharge far enough through resistor 162 to produce a voltage across capacitor 166 greater than the reference voltage at terminal 170. Consequently, no further trigger pulses are produced for insertion in delay circuit 173.

When the near zone counter 32a of FIG. 1 then supplies a positive pulse in FIG. 4 to the base 161a of transistor 161, transistor 161 conducts, discharging capacitor 167. This event causes an abrupt change in the output of voltage comparator 168, which change is supplied directly to an input of AND gate 174. Polarities are chosen so that this voltage inhibits the transmission of an output from delay device 174 to the input of pulse generator 180. Consequently, filling the near zone counter 32a simultaneously with the filling of the far zone counter 32, or less than 1 millisecond after the filling of far zone counter 32, prevents generation of the accept gate by pulse generator 180 for use by AND gate 36 of FIG. 1; generator 180 cannot generate outputs until both counters have failed to fill for at least one count cycle. The duration of the output of pulse generator 180 is selected to determine the minimum relative speed to which the system is sensitive.

The gating channels systems 20 and 21 of FIG. 1 are adapted to be fed echo signals by dispersionless transmission lines 13, 30, and 30a, line 13 being coupled to antenna 6. The nature of the antenna 6 and transmission line system 13 will be understood by reference to FIGS. 5, 6, and 7. The receiver antenna 6 and its associated transmission line 13 may take the form shown in FIG. 5, where antenna 6 comprises a structure having mirror image symmetry about a median plane at right angles to the direction of the vector of the electric field propagating into antenna 6. The same general type of symmetry presides in the cooperating transmission line 13 which comprises parallel wire transmission line conductors 200 and 200a; conductors 200 and 200a are spaced wire conductors constructed of a material capable of conducting high frequency currents with substantially no ohmic loss and readily support TEM mode propagation of high frequency energy, with the major portion of the electric field lying between conductors 200 and 200a.

Figures 5, 6, 7:
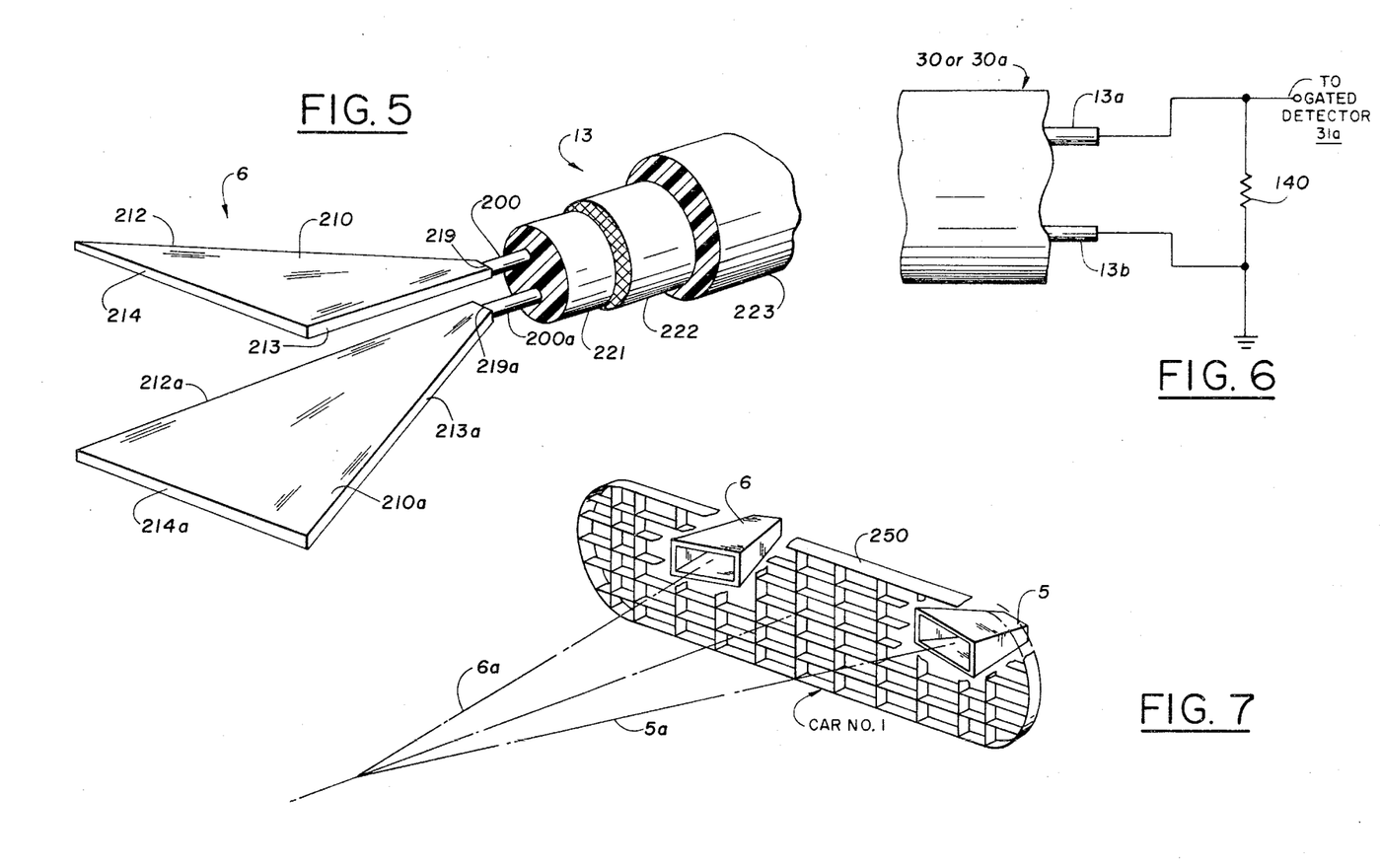
FIG. 5 is a perspective view, partly in cross section, of the receiver antenna of FIG. 1.
FIG. 6 is a plan view, partly in section, of a transmission line used in FIG. 1.
FIG. 7 is a perspective view illustrating the general location of the antennas of FIG. 1 in a representative vehicle.

The TEM receiver antenna 6 preferably consists of a pair of flared, flat, electrically conducting planar members 210 and 210a. Members 210 and 210a are, for example, generally triangular in shape, member 210 being bounded by flared edges 212 and 213 and a frontal aperture edge 214. Similarly, member 210a is bounded by flaring edges 212a and 213a and a frontal aperture edge 214a. Each of triangular members 210 and 210a is slightly truncated at its apex, the truncations 219 and 219a being so arranged that conductor 200 is smoothly joined without overlap at truncation 219 to antenna member 210. Likewise, conductor 200a is smoothly joined without overlap at truncation 219a to antenna member 210a. It is to be understood that the respective junctions at truncations 219 and 219a are formed using available techniques for minimizing impedance discontinuities.

It is also to be understood that the flared members 210 and 210a of antenna 6 are constructed of material highly conductive for high frequency currents. The interior volume of antenna 6 may be filled with an air foamed dielectric material exhibiting low dielectric loss in the presence of high frequency fields, such material acting to support conductor 210 in fixed relation to conductor 210a. Alternatively, the conductive elements of antenna 6 may be fixed in spaced relation by dielectric spacers (not shown in FIG. 5) which may cooperate in forming enclosing walls, thereby protecting the interior conducting surfaces of antenna 6 from the effects of precipitation and corrosion.

The planar collector elements 210 and 210a of receiver antenna 6 are coupled in impedance matched relation to the two wire transmission line 13. Transmission line 13 is arranged to have the same impedance as the transmission line comprising antenna elements 210 and 210a. Transmission line 13 may have its parallel wire conductors 200 and 200a molded into a dielectric enclosing element 221 for the purpose of accurately determining the separation of conductors 200 and 200a so that transmission line 6 has a constant impedance along its length. Dielectric element 221 may be surrounded, in turn, by a braided or other conductive shield 222 which may be grounded at any convenient location. Shield 222 may, in turn, be surrounded by a protective plastic cover element 223 of the well known type.

As indicated in FIG. 6, the transmission lines 20, 30a which branch from matched tee junction 14 in FIG. 1 and which respectively feed echo signals to far zone gated detector 31 and to near zone gated detector 31a are preferably of construction similar to the dispersionless dual conductor transmission line 13 of FIG. 5. Transmission line 30 is thus readily coupled to the base of detector transistor like transistor 74 within far zone gated detector 31. Likewise, transmission line 30a is readily coupled to the base of a detector transistor 74 within the near zone gated detector 31a.

The cooperating antenna 6 and transmission line system of the form shown in FIGS. 5 and 6 is a preferred receiver antenna system, in part, because desired TEM mode propagation therein is readily established. The TEM propagation mode is preferred, since it is the substantially non-dispersive propagation mode and its use therefore minimizes distortion of the propagating sub-nanosecond pulse signal received by antenna 6. The simple dual conductor transmission line structure also permits construction of the antenna-transmission line configuration with minimum impedance discontinuities. The characteristic impedance of antenna 6 is constant along its length and may thus be readily made equal to that of transmission line 13. By maintaining a continuously constant characteristic impedance and TEM propagation along the structure including antenna 6 and transmission lines 13, 30, 30a, frequency sensitive reflections are prevented therein and frequency dispersion is eliminated. A received sub-nanosecond impulse therefore flows through antenna 6 into transmission lines 13 and 30 and 30a without substantial reflection and without substantial degradation of its shape or amplitude. Since the full energy or amplitude of a low-level sub-nanosecond base-band pulse is thus delivered to the far- or near-gated receiver detectors 31 and 31a by the antenna-transmission line system it is seen that the received detectors can be sensitive to extremely short low-level base-band pulses having an extremely wide spectral content, any component of which would be incapable of detection using conventional wide pulse reception techniques. Antenna 6, along with transmitter antenna 5, will generally be mounted with respect to a protected vehicle as indicated in FIGS. 1 and 7. In FIG. 7, a representative installation is shown wherein antennas 5 and 6 are located just behind a dielectric or other substantially open grille 250 at the front of the protected vehicle. Other frontal or other locations will readily be found to be suitable.

The output of actuator 39 appearing at terminal 283 in FIG. 1 may be beneficially employed in various ways; it may be used to provide a visual or audible warning of the impending collision event or may be used to actuate conventional protective devices, such as inflatable gas bag devices, for reducing the possibility of injury to a passenger whose body would otherwise strike the dash board of the vehicle. For example, the output at terminal 283 may be applied to operate a lamp whose optical path projects through an aperture in the speedometer dial and whose illumination may therefore be viewed by occupants of the vehicle. Preferably, a horn having a stridant tone is actuated by the output of actuator 284 for the same purpose.

Various protective devices may similarly be operated by actuator 39, such as conventional gas bag restraint device. In the event of a collision, the gas bag is expanded rapidly, forming a cushion between occupants facing the vehicle instrument panel, and restraining the passengers so that they do not collide with the panel or windscreen as the vehicle is rapidly decelerated. It will be understood by those skilled in the art that additional gas bags in other locations within the vehicle may be used to protect other passengers from hitting the sides, roof, or other parts of the vehicle interior. Furthermore, the output of actuator 45 appearing at terminal 283 may be supplied to a suitable means such as a solenoid for actuating vehicle brakes, whether or not they have already been applied by the vehicle driver. While automatic actuation of brakes will not necessarily diminish the actual chance of collision, at least some of the vehicle energy will be dissipated, reducing consequent probabilities of destruction of life and property. Operation of externally mounted equipment, such as extendable bumpers, may also be readily accomplished.

It is seen that the novel collision sensor system receiver of FIG. 1 is a wide band or wide open detector device, a receiver which will respond to any signal level in excess of the bias level which might be dictated by the characteristics of a particular transistor gated detector 74. The amplitude of the received base-band pulse at the receiving antenna 6 may be, for example, about 200 millivolts in a typical operation circumstance, a value several orders of magnitude greater than the signals present in an urban environment due to conventional radiation sources, such interfering signals normally being at microvolt level. Accordingly, although the collision sensor receiver of FIG. 1 essentially accepts all echo signals over a very wide pass band, it is substantially immune to interference from conventional radiation sources, including electrical noise signals.

The directive antenna-transmitter configuration 5, 10 shown in FIG. 1 may, for instance, transmit a regular train of extremely short duration, relatively low amplitude base-band pulses. In one typical situation, these impulse-like signals have time durations of substantially 200 picoseconds and a pulse repetition frequency of the order of 10 kHz. However, the upper bound on the average power transmitted into space may be less than one microwatt. The spectrum of the transmitted base-band signal is spread over an extremely wide band, typically 100 megahertz to 10 gigahertz. Accordingly, the power radiated in any typical narrow communication band is far below the thermal noise threshold of a typical conventional communication receiver operating in that band. The transmitted base-band pulse is therefore incapable of interfering with the operation of standard radio communication equipment, while being remarkably adapted for use with the novel vehicle safety apparatus of the present invention.

While the invention has been described in its preferred embodiments, it is to be understood that the words which have been used are words of description rather than of limitation and that changes within the purview of the appended claims may be made without departing from the true scope and spirit of the invention in its broader aspects.

I claim
1. Vehicle safety apparatus comprising:
transmitter means adapted to be carried by said vehicle for transmitting base-band pulse signals toward a reflecting object appearing in first or second range zones with respect to said vehicle,
receiver means adapted to be carried by said vehicle and having transmission line means receiving signals reflected by said object when within said first or second range zones,
first circuit means responsive to said received object reflected signals from said first zone and coupled to said transmission line means for producing first output signals of substantially greater duration than said base-band transmitted signals,
second circuit means responsive to said received object reflected signals from said second zone and coupled to said transmission line means for producing second output signals of substantially greater duration than said base band transmitted signals,
first pulse forming means responsive to a predetermined number of said pulses of substantially greater duration for providing a formed first output pulse,
second pulse forming means responsive to said predetermined number of said pulses of substantially greater duration for providing a formed second output pulse,
delay circuit means for differentially delaying said formed first output pulse with respect to said formed second output pulse, and
means responsive to substantial coincidence between said delayed formed first output pulse and said formed second output pulse for producing an output control signal, and
safety means responsive to said output control signal.

2. Apparatus as described in claim 1 wherein said transmitter means includes means for transmitting, without distortion, a train of sub-nanosecond duration electromagnetic pulses each having a wide frequency range spectral line content, the energy in any selected one of said spectral lines being substantially below the ambient noise level.

3. Apparatus as described in claim 1 wherein said transmitter means comprises:
substantially non-dispersive transmission line transmitter antenna means for propagating and radiating a train of electromagnetic pulses in the TEM transmission line mode toward said object, and
synchronizer means for exciting said non-dispersive transmission line antenna means.

4. Apparatus as described in claim 3 wherein said receiver means comprises substantially non-dispersive transmission line receiver antenna means for receiving and propagating an object reflected electromagnetic pulse train in the TEM transmission line mode.

5. Apparatus as described in claim 3 wherein said first circuit means comprises:
first zone gate generator means responsive to said synchronizer means for producing first zone gating signals, and
first zone gated detector means responsive to said first zone gating signals and to said first zone received signals for producing said first output signals of substantially greater duration.

6. Apparatus as described in claim 5 wherein said second circuit means comprises:

second zone gate generator means responsive to said synchronizer means for producing second zone gating signals, and second zone gated detector means responsive to said second zone gating signals and to said second zone received signals for producing said second output signals of substantially greater duration.

7. Apparatus as described in claim 3 wherein said first and second pulse forming means comprise first and second counter circuit means.

8. Apparatus as described in claim 7 additionally including third counter circuit means responsive to said synchronizer means for resetting said first and second counter circuit means.

9. Apparatus as described in claim 8 responsive to the output of said second counter circuit means for inhibiting the output of said delay circuit means.

10. Apparatus as described in claim 9 wherein said third counter circuit means counts one plus said predetermined number of said pulses of substantially greater duration for providing a third output pulse.

11. Apparatus as described in claim 10 wherein said third output pulse resets said third counter circuit means.

12. Apparatus as described in claim 1 wherein said safety means comprises passenger protective means operative in response to said output control signal.

13. Apparatus as described in claim 12 wherein said safety means provides means responsive to said output control signal for restraining vehicle occupants from impacting interior parts of said vehicle.

14. Apparatus as described in claim 13 wherein said means for restraining vehicle occupants comprises an expandable occupant restraint means having a normal contracted state, container means for supplying gas, and means responsive to said control signal for causing gas flow from said container means into said expandable restraint means.

* * * * *